May 14, 1957 — O. SCHUCHERT — 2,792,102
ELEVATING AND CONVEYING APPARATUS
Filed May 18, 1953 — 5 Sheets-Sheet 1
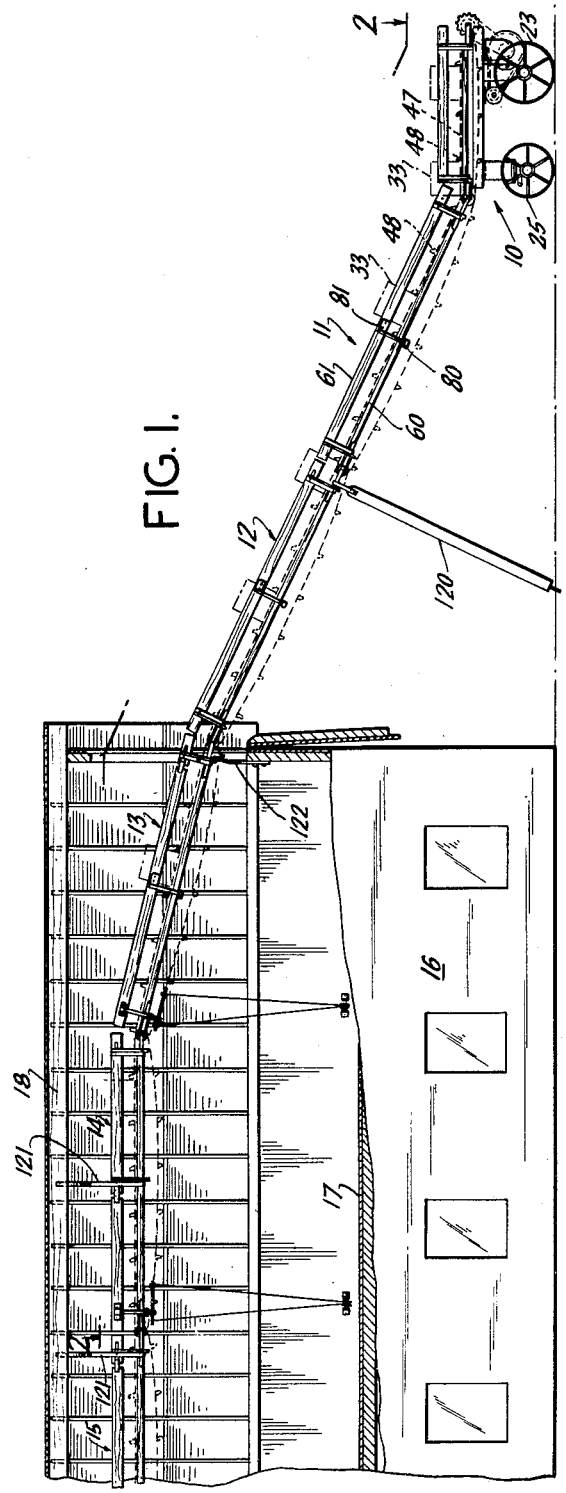
FIG. I.
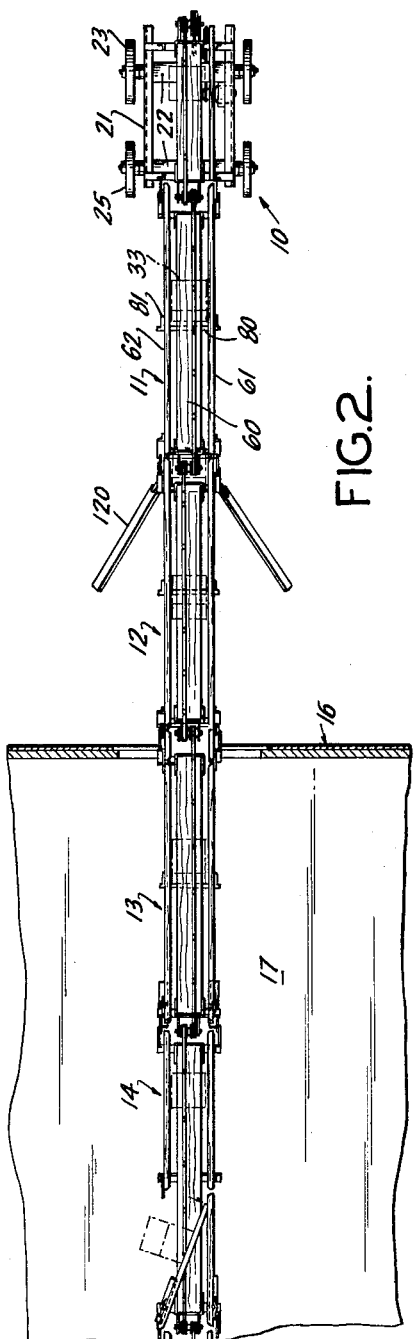
FIG. 2.
INVENTOR.
OAKEY SCHUCHERT
BY
Morgan, Finnegan, Durham & Pine
ATTORNEYS.

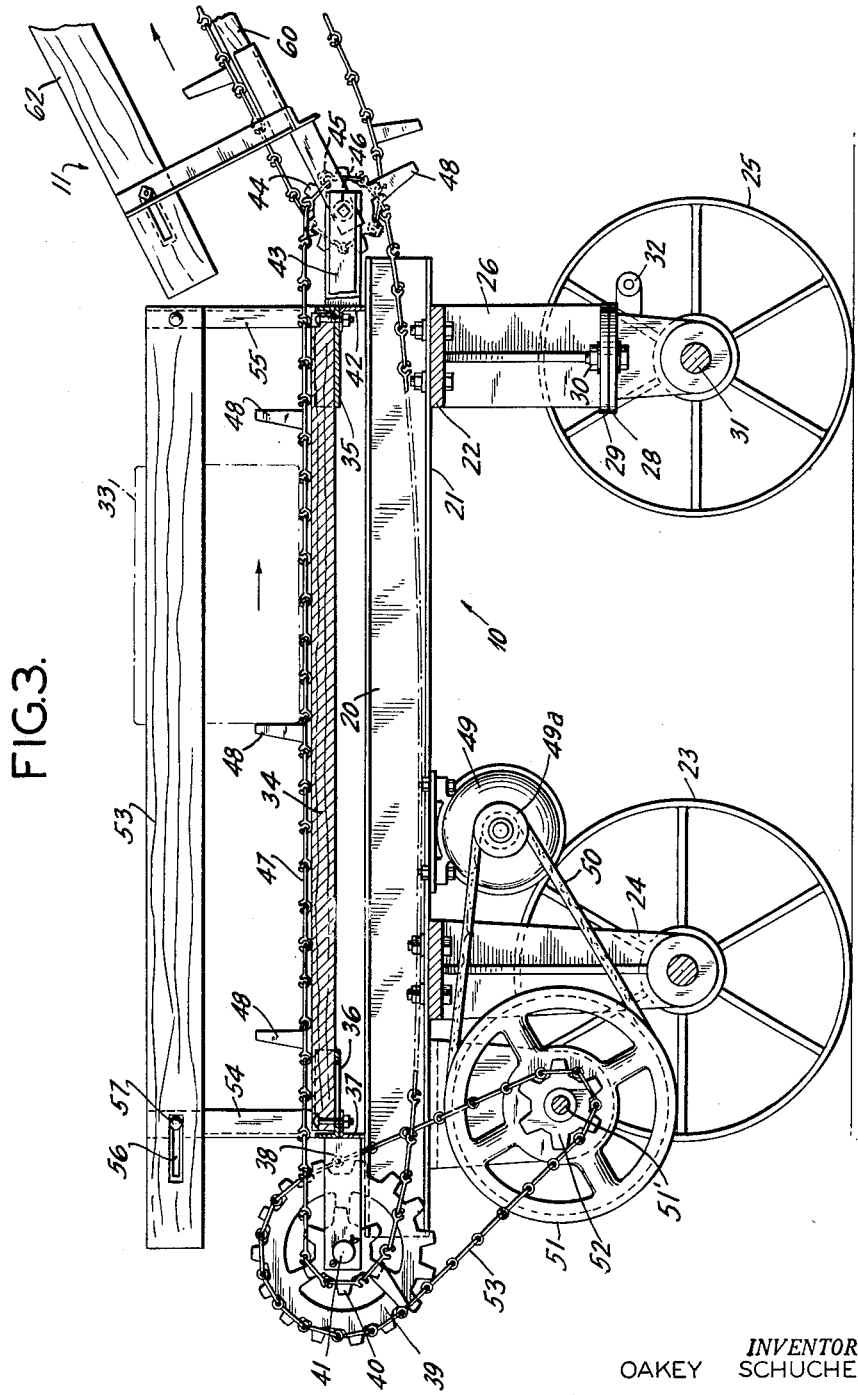

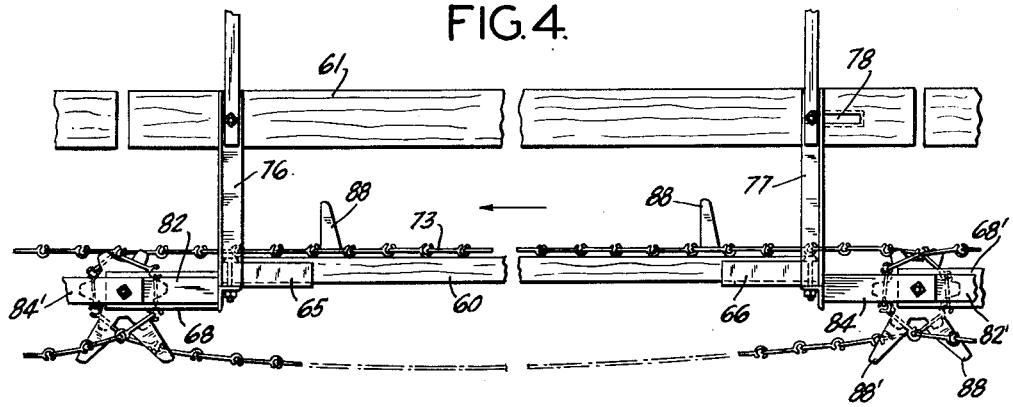
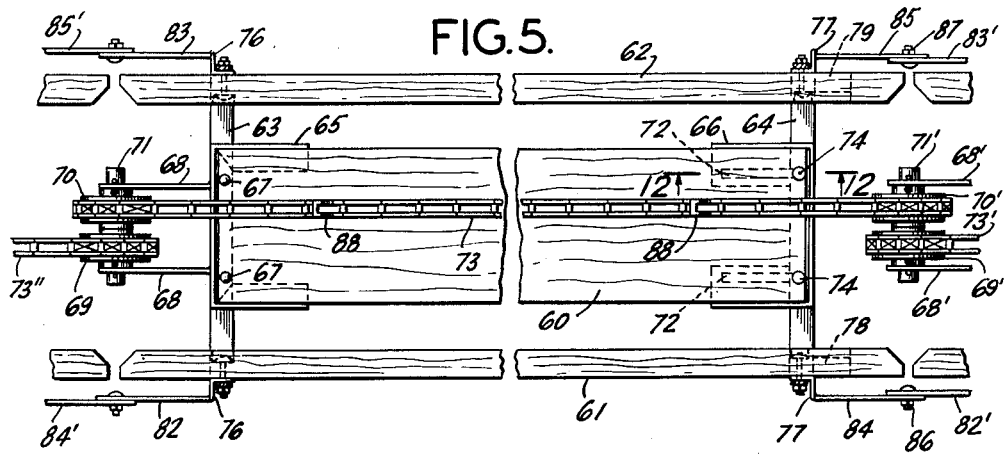
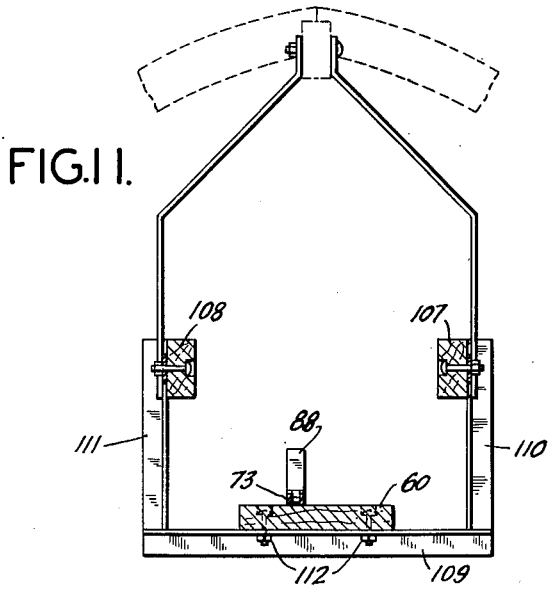
INVENTOR.
OAKEY SCHUCHERT
BY
ATTORNEYS.

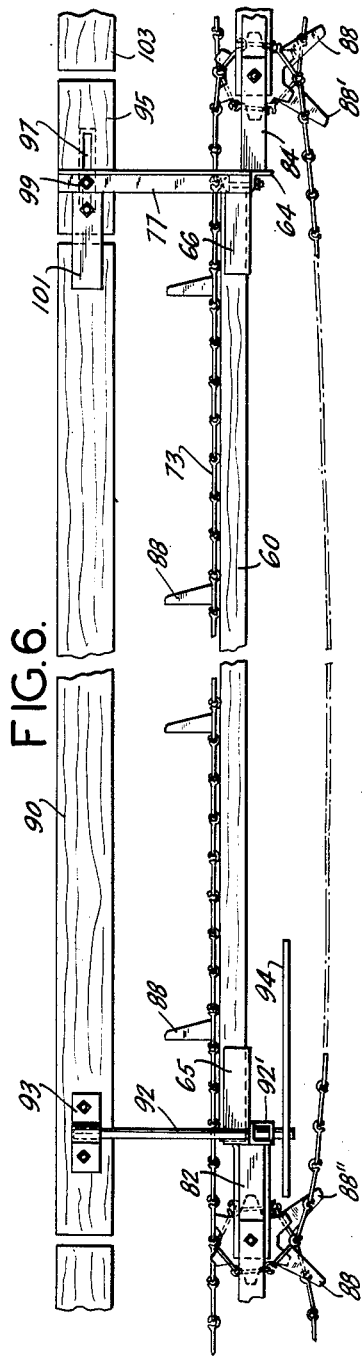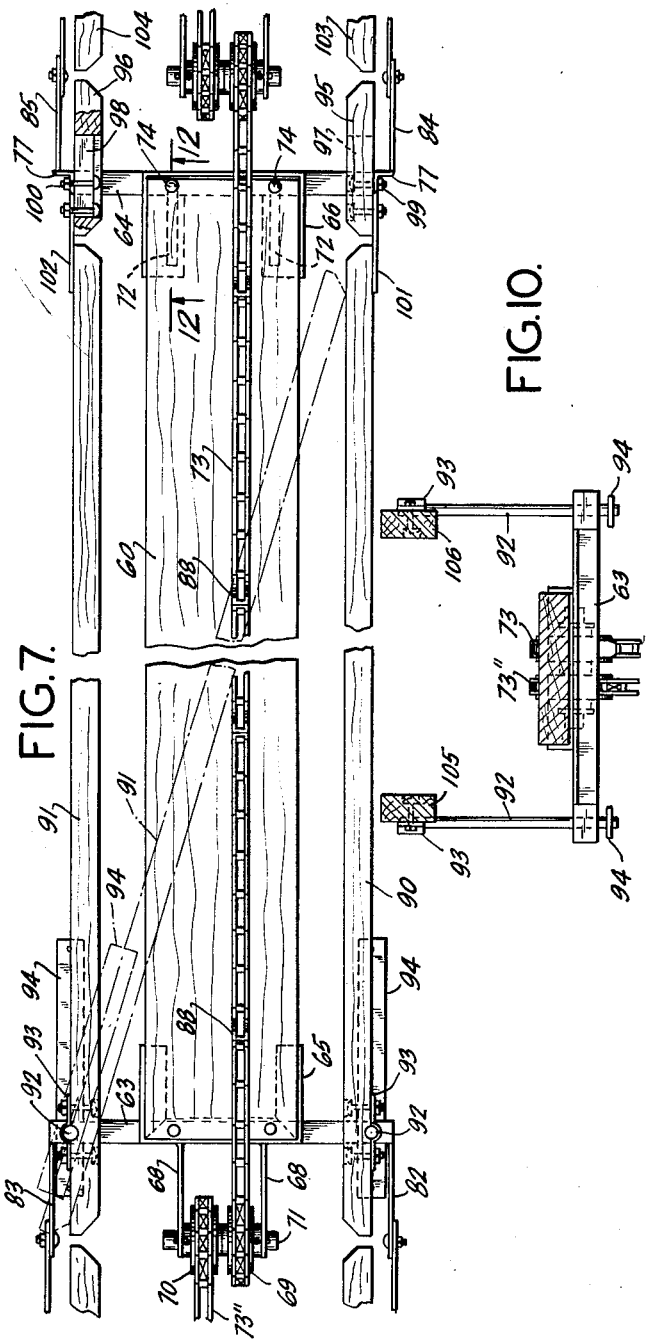

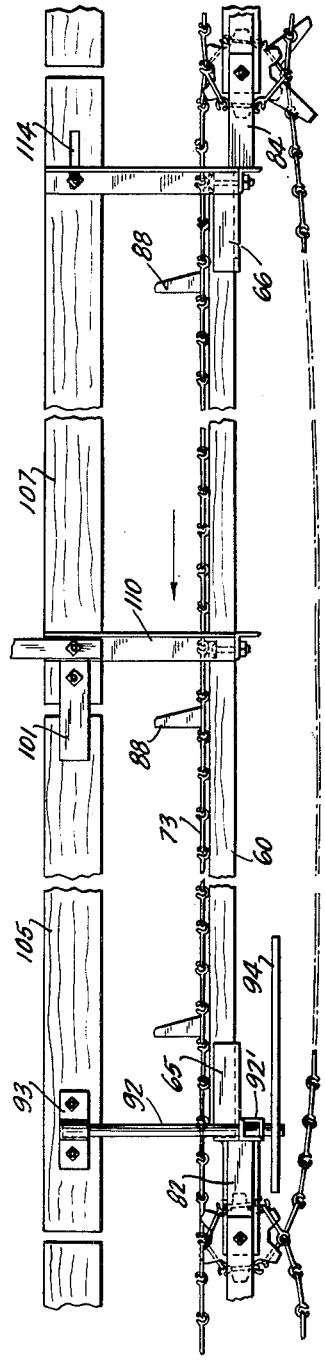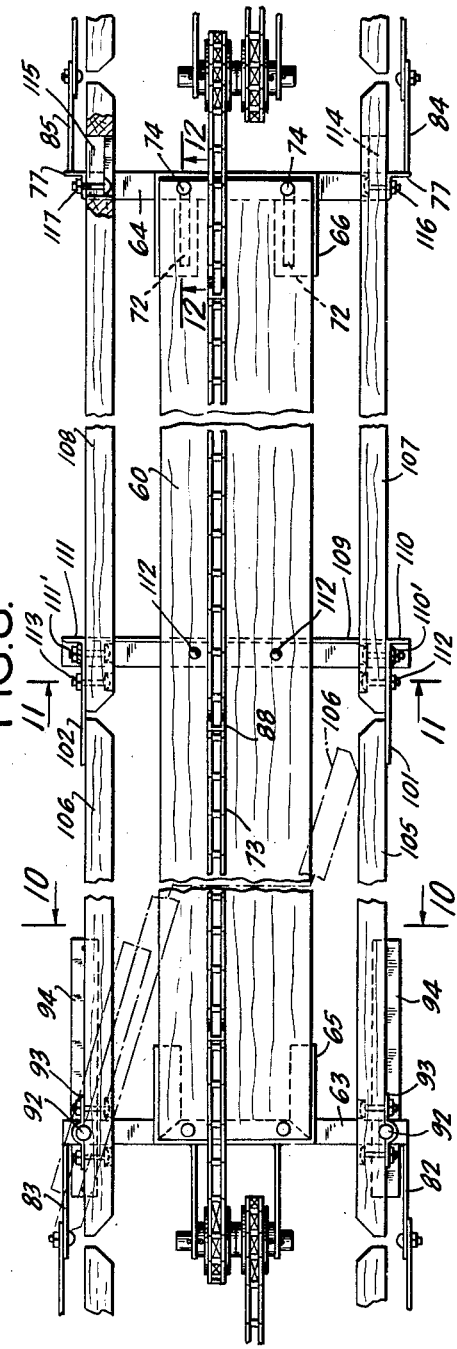
FIG.8.
FIG.9.

United States Patent Office 2,792,102
Patented May 14, 1957

2,792,102

ELEVATING AND CONVEYING APPARATUS

Oakey Schuchert, deceased, late of Iowa City, Iowa, by Margaret Vernie Schuchert, administratrix, Iowa City, Iowa Application May 18, 1953, Serial No. 355,564

4 Claims. (Cl. 198—92)

This invention relates to elevators and conveyors and concerns a chain or belt conveyor apparatus that has as one of its purposes the transportation of bales of hay and packaged products to a storage area and the selective distribution thereof within such area.

This new and improved apparatus embodies an arrangement of readily available and inexpensive components that will provide dependable and trouble free operation. In view of its light weight and maneuverability, one man for example can arrange the equipment quickly and easily for the transportation of packaged products to a storage area and perform the entire loading and distributing operations.

Another object of the invention is a conveyor that is readily adaptable for transporting packaged products between points at the same or different levels as for instance the loading of baled hay into elevated storage areas of barns and the like.

Another object of the invention is an elevator and conveyor that by reason of its low cost, maneuverability and versatility makes it an extremely efficient and productive equipment, particularly adaptable for use on both large and small farms.

Still another object of the invention is a simple and effective bale loader designed and fabricated to provide dependable service and one that can be repaired and maintained without the necessity for special knowledge and equipment.

A further object of the invention is an improved loader and conveyor formed in sections that can be easily taken apart and reassembled for movement from one location to another and wherein any number of sections may be joined together for a single operation.

Another object of the invention is a new and improved elevator and conveyor assembly.

The above and other objects of the invention will become apparent from the following description and accompanying drawings forming part of this application.

In the drawings:

Fig. 1 is a side elevation of one embodiment of the invention;

Fig. 2 is a plan view of the embodiment shown in Fig. 1;

Fig. 3 is a side elevation of the loading platform and drive mechanism illustrated in Figs. 1 and 2;

Fig. 4 is a side view of a single ungated section of the embodiment shown in Figs. 1 and 2;

Fig. 5 is a plan view of the conveyor section shown in Fig. 4;

Fig. 6 is a side elevation of a gated section for discharging transported objects at predetermined positions;

Fig. 7 is a plan view of the gated section shown in Fig. 6;

Fig. 8 shows another embodiment of a gated section of the type illustrated in Fig. 6;

Fig. 9 is a top view of the modified gated section shown in Fig. 8;

Fig. 10 is a cross sectional view of the gated section of Fig. 9 taken along the line 10—10 thereof;

Fig. 11 is a cross sectional view of the gated section of Fig. 9 taken along the line 11—11 thereof and showing one form of bracket for supporting certain conveyor sections above the storage area; and Fig. 12 is a cross sectional view of an end bracket as illustrated in the forms of the invention shown in Figs. 5, 7 and 9 and taken along the line 12—12 of those figures.

Briefly, the elevator and conveyor according to the invention comprises a loading platform and drive unit and a plurality of light connectable sections that can be connected to the loading platform and to each other to form a conveyor and elevator readily adaptable to handling bales of hay, paper and other packaged materials. Certain sections may be permanently or semi-permanently installed over the storage area while the loading platform and approach sections can be readily moved about for use with one or more sets of installed sections. Thus in the case of farm applications where several hay mows are used, each mow may have sections permanently affixed to the roof framing so that a single loading platform with one or more approach sections will serve all of the mows.

Figs. 1 and 2 illustrate an elevator-conveyor in accordance with the invention and positioned to load bales of hay into the hay mow of a barn. In these figures 10 denotes the loading platform and drive mechanism, the approach sections are denoted by the numerals 11 and 12 while those sections that may be installed within the mow are denoted by numerals 13, 14 and 15. While the sections 13–15 are shown supported above the floor 17 of the barn 16 by attachment to the roof framing 18 it is apparent that they can be supported by the floor when it is desirable to do so. In addition, each of the sections 11 to 15 is severable one from the other and from the loading platform 10, and each section can be quickly and easily dismantled for storing, shipping or transporting from one location to another.

The loading platform and drive mechanism is shown in detail in Fig. 3 and comprises a chassis 20 having two longitudinal beams 21 tied together with front and rear cross members 22 (see Fig. 2). The rear wheels 23 are fastened to the frame 20 by downwardly depending brackets 24 while the front wheels 25 are supported by an upper yoke 26 with its legs fastened to the sides of the frame 20 and a lower inverted yoke 27 having its transverse member 28 pivotally attached to the transverse member 29 of yoke 26 by means of a bolt assembly 30. The axle 31 carrying wheels 25 is supported by the legs of yoke 27 which is also provided with a lunette 32 for towing the vehicle 10 from one place to another.

The height of the under carriage described above is preferably slightly lower than the floor of a truck body to facilitate loading of the bales 33. The upper structure of the carriage which comprises in effect the first section or loading platform of this embodiment of the invention consists of a base member 34 supported at its ends by end brackets 35 and 36. As these brackets are identical to those used on the conveyor section shown in somewhat larger scale in Figs. 4 and 5 and to be described in connection therewith a detailed description will therefore be omitted. The end bracket 36 is fastened to a transverse angle member 37 having its ends welded or otherwise secured to the carriage beams 20. A pair of arms 38, welded to the transverse member 37, extends rearwardly to support a pair of sprockets 39 and 40 keyed to a shaft 41 which in turn is mounted in journals carried by the outer ends of these arms. A similar structure is provided on the front end of carriage 20 and comprises a transverse angle member 42 carrying the end bracket 35 and a pair of arms 43 carrying sprockets 44 and 45 keyed to the shaft 46.

The sprockets 40 and 44 engage an endless chain 47 which lies centrally of the base 34 and is fitted with a plurality of spaced lugs 48 for engaging and transporting the bales 33. As will be described in connection with Figs. 4 and 5, the plank or base 34 in addition to providing support for the bales, cooperates with the end bracket 36 to adjust the tension on the chain 47 and prevent it from being dislodged from its cooperating sprockets.

The drive mechanism includes the electric motor 49 as the propelling means although any other primary power source as a gasoline motor or the like may be used. The motor 49 is secured to the underside of carriage 20 and is coupled by a V belt 50 to a pulley 51 keyed to the countershaft 51' which is also carried on the underside of carriage 20. The countershaft 51' is in turn coupled to the shaft 41 by a sprocket 52 keyed to shaft 51' and a chain 53 engaging sprockets 52 and 39. In this way, substantial speed reduction is accomplished between the motor 49 and the conveyor chain 47, and in the event a foreign object becomes jammed in the mechanism at one point or another, the pulley 49a on motor 49 can be arranged to slip relative to the belt 50 and thus prevent serious damage to the equipment.

The remainder of the loading platform 10 consists of a single guide rail 53 on one side of the carriage 20 and supported by two upright posts 54 and 55 of angle iron or the like. The rail 53 is bolted firmly to the post 55 and is slidably mounted on post 54 by means of a slot 56 in order to compensate for slight variations in the distance between posts 54 and 55 brought about by the adjustment of end bracket 36 relative to the base 34 to remove unnecessary slack from the chain 47. When the tension of chain 47 is properly adjusted by means of the base member 34, then the bolt 57 in slot 56 is tightened to secure the rail 53. This structure enables the bales to be loaded directly from a truck or other conveyance onto one side of the loading platform without the necessity for any manual operations other than rolling them onto the conveyor platform. Moreover, the base member 34 and rail 53 are preferably formed of wood planking such as a nominal 2" x 10" plank for the base and a nominal 2" x 4" member for the rail.

The approach sections 11 and 12 are constructed somewhat similarly to the loading platform 10 and are shown in Figs. 4, 5 and 12. Each of these sections has a basic structure comprising generally a base member 60 and fixed guide rails 61 and 62. At the ends of the base member 60 are transverse angle members 63 and 64 fastened thereto by end brackets 65 and 66. The end bracket 65 is formed of L shaped angle stock bent in the form of a U to fit the rectangular end of base 60. This bracket may be welded or otherwise fastened to the transverse support 63 and secured to the base 60 by bolts 67. A pair of arms 68 extends outwardly from the end bracket 65 for rotatably supporting two sprockets 69 and 70 keyed to a shaft 71.

The end bracket 66 is similar in structure to the end bracket 65 but, in addition, is provided with a pair of slots 72 so that the distance between the transverse members 63 and 64 can be adjusted to take up slack in the conveyor chain 73. With reference to Fig. 12, it will be observed that the end bracket 66 may be welded to the transverse member 64. The base 60 is secured in position by the bolts 74 passing through holes in the base and engaging slots 72 in the end bracket 66. In this way, the spacing between the transverse members can be adjusted to compensate for slight variations in the chains or to take up slack in the event the chain may become slightly elongated through use.

Each transverse member 63 and 64 is provided with a pair of upright supports 76 and 77 respectively for holding the guide rails 61 and 62. One end of each rail is bolted firmly to the upper end of one of the uprights 76 while the other end of the rails 61 and 62 has slotted openings 78 and 79 respectively for engagement with suitable bolts for securing them to the uprights 77. These slots 78 and 79 compensate for differences in the distance between the transverse members 63 and 64 resulting from the adjustment of the chain 73 as previously described. If desired, each approach section may also be provided with an intermediate rail support as shown in Figs. 1 and 2 comprising a transverse member 80 fastened to the base 60 and upright members 81 secured at their lower ends to their respective rails 61 and 62.

The individual sections such as 11 and 12 are linked together and to the loading platform by connecting brackets or links that space the sections one from the other and hold them in alignment. These brackets are denoted in Figs. 4 and 5 by the numerals 82 to 85 inclusive. The connecting links or brackets 82 and 83 are welded to the ends of the transverse member 63 and extend outwardly from the end of the section and generally parallel to the base 60. Connecting links 84 and 85 are similarly fastened to transverse member 64 and extend outwardly from the other end of the section in line with brackets 82 and 83.

Assuming that the conveyor section of Figs. 4 and 5 transports bales from right to left as shown by the arrow, the preceding section, one end portion of which is illustrated at the right of the figures, is connected to the illustrated section by fastening its connecting links 82' and 83' to the connecting links 84 and 85 of the illustrated section. This coupling may be accomplished by bolts 86 and 87 or other suitable axial fastening means that will provide for pivotal movement of one section relative to the other. By connecting the forward end of one section to the trailing end of the succeeding section as just described the sprocket assembly of the preceding section, including the sprockets 69' and 70', shaft 71' and brackets 68', is positioned to receive the chain 73 which passes over the sprocket 70 of the illustrated section and the sprocket 70' of the preceding section. Since the driving means is on the loading platform 10, chain 73' of the preceding section is driven and as it engages its sprocket 69' which is keyed to shaft 71', it in turn drives the chain 73 on the illustrated section. As in the case of the loading platform, the chains 73 and 73' include lugs 88 and 88' respectively for engagement with the bales being transported. Therefore, the chains 73' and 73 of successive sections must be synchronized so that a lug 88 on a successive section will engage a bale as the preceding lug 88' is about to pass over its forward sprocket 69'.

In like manner, the section following the one illustrated in Figs. 4 and 5 is connected by its connecting links 84' and 85' and the conveyor chain 73" engages and is driven by the sprocket 69. In this way, any number of sections as 11 to 15 of Fig. 1 can be linked together and driven by a common drive mechanism at either end of the conveyor system. Moreover, it will be observed in Figs. 4 and 5 for instance that the connecting link bolts 86 and 87 are in line with the sprocket shaft 71' so that adjoining sections may be positioned sloped relative one to the other.

The gated sections illustrated in Figs. 6 and 7 are provided with the same fundamental structure as the section shown in Figs. 4 and 5 and, therefore, the description of Figs. 4 and 5 applies equally to Figs. 6 and 7 with the exception of the guide rail structure now to be discussed. To simplify references to Figs. 4 and 5, like numerals have been used in Figs. 6 and 7 to denote like elements.

In these figures, the guide rails 61 and 62 (Fig. 5) have been replaced with pivoted rails 90 and 91 for discharging a bale on either one side or the other of the conveyor. For this purpose the upright rail supporting members 76 of Figs. 4 and 5 are replaced with upright shafts 92 journalled at the ends of the transverse member 63 by bearings 92'. The pivotable section of the rails 90 and 91 are fastened to the upper ends of their respective shafts by suitable clamps 93 bolted or otherwise secured to the rail so that rotation of one shaft 92 will in turn rotate its associated rail. The lower end of each shaft is fitted with a lever arm 94 for moving the rails from an open position to a closed position or vice versa. Any simple arrangement of ropes and pulleys may be used for the operation of levers 94, as for instance that arrangement shown in Fig. 1 wherein ropes are connected to each end of each lever 94 and passed over pulleys that may be secured to the wall of the storage area or the levers may be actuated by remote controlled power operated devices such as motors and the like.

The opposite end of this fully gated section is provided with short fixedly mounted guide rail sections 95 and 96 slidably fastened to the ends of uprights 77 by means of slots 97 and 98 and cooperating bolts 99 and 100. A pair of gate stops 101 and 102 welded to the uprights 77 overlap the free end of their associated gates 90 and 91 to limit the outward movement of the gates to a position substantially parallel to the base member 60. For illustration, the open position of gate 91 is shown in dotted outline and will function to discharge the bale to the right.

In the assembly of the fully gated section, the chain 73 is adjusted in the manner described in connection with Figs. 4, 5 and 12 by means of bolts 74 passing through the plank 60 and cooperating with slots 72 in end bracket 66. Upon completion of this adjustment the short rail sections 95 and 96 are adjusted to provide proper end clearances between the gated rail sections 90 and 91 and the rail ends of the preceding section denoted in these figures by the numerals 103 and 104.

It is apparent from the above description of the fully gated section that it can be linked with standard or ungated sections such as 11 and 12 of Figs. 1 and 2 or may be interposed between them. Moreover, many of the basic components of both types of sections are identical and interchangeable for instance the base plank 60, end brackets 65 and 66, the conveyor chains and associated brackets. Furthermore, the rails 61 and 62 of the standard sections and the gated rails 90 and 91 in Figs. 6 and 7 may be easily fabricated of standard wood members having a nominal cross section of two inches by four inches that are generally available in all lumber yards. The unique arrangement of the elements of both types of sections enables them to be easily and quickly assembled in position for use and disassembled for storage.

The manufacture of this conveyor is resolved to the fabrication of a few easily formed elements most of which are common to all sections and the user can supply the wood members from local suppliers. In this way, a dependable and valuable piece of equipment can be marketed for an exceedingly low cost. If desirable, the wood members such as the bases and rails can be made of metal such as steel or aluminum.

In certain instances it may be preferable to have sections wherein only part of the guide rails is gated. These sections may be termed partially-gated sections and are illustrated in Figs. 8 to 11 of the drawings. In these figures as in the case of Figs. 6 and 7, certain structural members are identical to those described in connection with Figs. 4 and 5 and, therefore, like numerals have again been used to denote like elements.

The partial gates 105 and 106 extend over approximately half of the length of the section and are supported by upright shafts 92 in the same manner as described in connection with the fully gated sections of Figs. 6 and 7. The fixed rail sections 107 and 108 are supported in much the same way as the rails 61 and 62 of Figs. 4 and 5 except that a central rail support is required for the left end thereof. This support comprises a central transverse member 109 having upright members 110 and 111 fastened to the ends thereof. The transverse member 109 is bolted to the base 60 by bolts 112 and the rails 107 and 108 are fastened to the upper end of uprights 110 and 111 by bolts 110' and 111'. The stops 101 and 102 may be welded to the upright members 110 and 111 and also bolted to the rails by bolts 112 and 113. The right hand end of rails 107 and 108 are adjustably mounted on the upper end of the upright members 77 by means of slots 114 and 115 and cooperating bolts 116 and 117. The gates 105 and 106 are operated by levers 94 as previously described and the open position of gate 106 is shown in dotted outline.

It is apparent that this new and improved bale transporting device as described above can be installed in a variety of ways to accomplish a given end. One arrangement for the use of this invention is illustrated in Fig. 1 wherein the loading platform 10 is positioned outside of a barn 16 with two standard sections forming an elevated conveyor from the loading platform to the opening of the storage area. The center point of these two sections may be supported by two simple supports 120 while the upper end of section 12 may be supported by the adjoining section 13 within the barn.

The partially gated section 14 and fully gated section 15 are supported by the roof frame 18 as by simple metal hangers 121 fastened to upright members such as 110 and 111 of Figs. 8, 9 and 11 or to upright members 76 and 77 of Figs. 4 through 9. The lower end of section 13 is supported within the barn by a bracket 122 (Fig. 1) and this bracket together with brackets 121 form the sole supporting means for all sections. Thus after the bales are loaded, the inside sections can remain in position within the barn while sections 11 and 12 can be disconnected for storage or for use with other similar sections for storing baled or packaged products or the like in other locations. Thus, with a single loading platform 10 and one or more approach sections 11 and 12 any number of storage areas on farms for instance can be quickly and easily loaded thus eliminating complicated and expensive devices or time consuming manual procedures.

Although this invention is particularly useful on farms and the like, it is apparent that it is of general usefulness in factories, plants and similar applications.

What is claimed is:

1. A conveyor comprising at least two connectable sections connected in end-to-end relationship, each section comprising a base member, a fixed end bracket on one end of said base member, a longitudinally adjustable end bracket on the other end of said member, a transverse member secured to each end bracket, an upright member on each end of each transverse member, a pair of guide rails fixedly secured to the upright members of one transverse member and adjustably secured to the corresponding upright members on the other transverse member, connecting links on the transverse member at each end of the section for interconnecting adjoining sections, a transverse shaft mounted on one only of said end brackets, a pair of sprockets keyed to said shaft and an endless chain extending longitudinally of said base member with the upper portion of the chain supported by the base member, said chain engaging one of said sprockets with the other sprocket engaging one end of a corresponding chain on an adjoining section, and spaced lugs on said chain for engaging objects to be transported from one end of each section to the other.

2. A conveyor for transporting objects comprising a plurality of connectable sections of which at least one is a gated section, said sections being connected in end-to-end relationship and said gated section comprising a base member, an endless chain encircling said base member and having object-engaging lugs thereon, a fixed end bracket on one end of said base member, a longitudinally adjustable end bracket on the other end of said base member, a transverse member secured to each end bracket, a pair of upwardly extending rods journalled at the ends of one transverse member, a movable rail member fixedly secured to the upper end of each rod and movable from a position parallel to said base member to a diagonal position crossing said base member, an upright member fastened to each end of the other transverse member, a fixed rail section carried on the upper end of each of said upright members including a gate stop for coopeartion with each movable rail member to limit the outward movement thereof, a transverse shaft mounted on one only of said end brackets and a pair of sprockets keyed to said shaft with one sprocket engaging said endless chain and the other sprocket engaging the chain of an adjoining section.

3. In a conveyor section having a base member and at least one pair of guide rails adapted to be positioned on each side and above said base member, and comprising an endless conveyor chain including object-engaging lugs, a pair of sprockets at one end only of said base member with one of said sprockets engaging said endless chain, rail-supporting brackets at opposite ends of said base member, one of said brackets being fixed to said base member and supporting said sprockets and the other being adjustable longitudinally of said base member and section-connecting links associated with each rail-supporting bracket for connecting the section to adjoining conveyor sections.

4. A conveyor section according to claim 3 wherein rotatable means are provided for supporting at least one guide rail at only one end thereof for pivotal movement of said rail in a horizontal plane.

References Cited in the file of this patent

UNITED STATES PATENTS

| | | |
|---|---|---|
| 357,145 | Dodge | Feb. 1, 1887 |
| 469,293 | Carver | Feb. 23, 1892 |
| 530,296 | Aiken | Dec. 4, 1894 |
| 767,162 | McNear | Aug. 9, 1904 |
| 1,898,120 | Farmer | Feb. 21, 1933 |
| 1,982,824 | Miltenberger | Dec. 4, 1934 |
| 2,219,055 | Pereslegin | Oct. 22, 1940 |
| 2,729,345 | Gisleson | Jan. 3, 1956 |

FOREIGN PATENTS

| | | |
|---|---|---|
| 57,836 | Sweden | Nov. 11, 1924 |
| 669,838 | Great Britain | Apr. 9, 1952 |